US007621275B2

(12) United States Patent
Fischer

(10) Patent No.: US 7,621,275 B2
(45) Date of Patent: Nov. 24, 2009

(54) COVER ASSEMBLY FOR OXYGEN MASK CONTAINERS

(75) Inventor: Hans Joachim Fischer, Oberhausen (DE)

(73) Assignee: Airbus Deutschland GmbH (DE)

( * ) Notice: Subject to any disclaimer, the term of this patent is extended or adjusted under 35 U.S.C. 154(b) by 546 days.

(21) Appl. No.: 11/064,667

(22) Filed: Feb. 24, 2005

(65) Prior Publication Data

US 2005/0194009 A1 Sep. 8, 2005

Related U.S. Application Data

(60) Provisional application No. 60/598,264, filed on Aug. 3, 2004.

(30) Foreign Application Priority Data

Feb. 26, 2004 (DE) ....................... 10 2004 009 346

(51) Int. Cl.

| | |
|---|---|
| ***A62B 18/08*** | (2006.01) |
| ***A62B 18/02*** | (2006.01) |
| ***A62B 7/04*** | (2006.01) |
| ***B64D 11/00*** | (2006.01) |

(52) U.S. Cl. ............................ 128/206.27; 128/206.21; 128/205.25; 128/204.29; 244/118.5

(58) Field of Classification Search ................. 244/147, 244/118.5, 129.1, 119; 128/204.18, 200.24, 128/202.27, 204.21, 204.29, 205.25, 206.21, 128/206.27

See application file for complete search history.

(56) References Cited

U.S. PATENT DOCUMENTS

| | | | | |
|---|---|---|---|---|
| 3,330,506 A | | 7/1967 | Robillard et al. | |
| 4,154,237 A | * | 5/1979 | Courter | 128/206.27 |
| 4,481,945 A | * | 11/1984 | Levine | 128/206.27 |
| 5,664,566 A | * | 9/1997 | McDonald et al. | 128/205.25 |
| 5,913,307 A | * | 6/1999 | Taieb et al. | 128/205.23 |
| 5,957,132 A | * | 9/1999 | McDonald et al. | 128/207.11 |
| 6,425,394 B1 | * | 7/2002 | Weinstein et al. | 128/200.24 |
| 6,526,967 B2 | * | 3/2003 | Cordero et al. | 128/200.24 |
| 6,755,194 B2 | * | 6/2004 | Taieb | 128/206.27 |
| 6,923,183 B2 | * | 8/2005 | Martinez et al. | 128/206.27 |
| 2003/0071172 A1 | * | 4/2003 | Harasta | 244/119 |
| 2004/0144384 A1 | | 7/2004 | Martinez et al. | |

FOREIGN PATENT DOCUMENTS

| | | | |
|---|---|---|---|
| DE | 199 44 655 C1 | | 2/2001 |
| EP | 1 433 502 | | 6/2004 |
| GB | 2 196 250 | | 4/1988 |
| WO | WO 90/02582 | * | 3/1990 |
| WO | WO 02/100487 A2 | | 12/2002 |

* cited by examiner

*Primary Examiner*—Justine R Yu
*Assistant Examiner*—Annette F Dixon
(74) *Attorney, Agent, or Firm*—Lerner, David, Littenberg, Krumholz & Mentlik, LLP

(57) ABSTRACT

A cover assembly for mask containers with two covers, wherein the covers have a pivot axis parallel to the longitudinal axis of the aircraft and further, are pivotable at 90°.

10 Claims, 2 Drawing Sheets

COVER ASSEMBLY FOR OXYGEN MASK CONTAINERS

CROSS-REFERENCE TO RELATED APPLICATIONS

This application claims the benefit of the filing date of U.S. Provisional Patent Application No. 60/598,264 filed Aug. 3, 2004, the disclosure of which is hereby incorporated herein by reference.

BACKGROUND OF THE INVENTION

The present invention relates to the placement of oxygen masks in oxygen containers, for example, in the ceiling area of an aircraft in the supply channel area or as an integrated single application. In particular, the present invention relates to a cover assembly for mask containers for arrangement in a standard supply channel of an aircraft, a mask container for an oxygen system of an aircraft, as well as an aircraft including a corresponding cover assembly.

FIG. 4 shows a typical plan view of a ceiling region of an aircraft, including a mask container of an oxygen assembly, as it is arranged today in aircraft.

As can be seen from FIG. 4, the mask container or holder 40 has an individual cover or lid 42, which by means of a hinge is mounted on the ceiling structure of the aircraft or on the structure of the mask container. A pivot axis of the hinge 44 is substantially perpendicular to a longitudinal axis 10 of the aircraft.

FIG. 5 shows a side view of this assembly, whereby the oxygen system in FIG. 5 is activated, that is, the cover or lid 42 is opened and the oxygen masks 26, which are connected via tubes 24 with an oxygen source, are dropped out of the mask container 40. Since supply channels, in which the mask containers are arranged, typically have a width of 40 cm in the ceiling region 20 of the aircraft, with essentially vertically, downward falling oxygen masks, merely a grasping region of approximately 40 cm is ensured. Therefore, the oxygen masks 26 essentially can be seized directly only over the center seat, when for example, the supply channel is arranged over a center seat of a three-seat row that is transverse to the flying direction of the aircraft.

According to JAR requirements, it is necessary that no sign, for example, a "Fasten Seat Belt" sign or a "No Smoking" sign, is covered also with opened covers 42 or an additionally sufficient redundant number of signs are to be mounted within the cabin. Typically, such signs 42 (FIG. 4) are integrated essentially centrally in the supply channels or are arranged (for example, in the ceiling region 20) in front of and/or behind the covers 42 of the mask container 40 over the supply channel. In order to ensure that the corresponding signs are visible from each seat, it is therefore necessary to provide further (redundant) signs at other locations in the ceiling region or some other place in the aircraft.

Providing a large number of redundant signs with non-activated oxygen systems means an increased expenditure of weight based on the cabling and physical signs.

SUMMARY OF THE INVENTION

According to one embodiment of the present invention, a cover assembly for mask containers is provided for arranging in a supply channel of an aircraft. The mask container has an opening. In this opening, for example, oxygen masks can be arranged, which upon the triggering of the oxygen system, for example, based on a pressure drop in the passenger cabin of the aircraft, must fall out from the mask container into a grasping region of passengers. The cover assembly of this embodiment includes a first cover and a second cover, whereby both covers, respectively, are mountable in a closed state, in which they close the opening of the mask container (non-triggered state). This is the typical operating state; the oxygen masks are stowed behind both covers in the mask container in the ceiling region of the passenger cabin of the aircraft. The first cover and the second cover, upon activation of the oxygen system, for example, with a drop in pressure, for testing purposes, or for maintenance, are mountable in an opened state. In the opened state, both covers uncover the opening of the mask container, such that the oxygen masks can fall out from the mask container into a region for grasping by the passengers.

An opening angle between the first and second cover in the opened state and a horizontal, respectively, is greater than 90°.

It may be advantageous in this connection that the opening angle is greater than 90°, and in this manner, it is ensured that with activation of the mask containers, a larger grasping area for the oxygen masks is achieved. Moreover, by the lateral opening of the mask container by means of two covers, the respective sizes of the covers are smaller and, in addition, by means of the laterally rotated guide, hanging-down covers do not prevent passengers from seeing the closest NSFS (No Smoking, Fasten Seatbelts) signs. In this manner, it may be ensured that the covering of visible areas of the passengers by opened covers is avoided, whereby fewer redundant signs, for example, No Smoking signs or Fasten Seat Belt signs, etc., are provided. This makes possible, for example, a weight savings and an optimization of the arrangement of the NSFS signs.

According to a further exemplary embodiment of the present invention, the first and second covers have pivot axes, which are substantially parallel to the longitudinal axis of the aircraft.

By means of the opening of the first and second covers to the side, signs, such as Fasten Seat Belt, No Smoking, etc., and components, such as loudspeakers, are no longer covered upon activation of the oxygen system at the typical points in the aircraft. In this manner, it is not necessary to provide redundant signs as well as additional loudspeakers, whereby a weight savings can be achieved.

According to a further embodiment of the present invention, retaining means (tension springs) are provided on the inner side of the covers, in order to hold the covers, respectively, in the opened state.

The retaining means may prevent an uncontrolled movement of the covers after opening.

According to a further embodiment of the present invention, the opening angle lies in the range of approximately 100° to approximately 180°.

Advantageously, this makes possible a wide opening angle of the covers.

According to a further embodiment of the cover assembly, straps are arranged on the inner surfaces of the covers, which, in the closed state, face into the mask container. Tubes of the oxygen masks are guided through the straps. If the oxygen system were activated and the covers opened further than 90°, preferably up to 180°, the straps with opened covers are laterally lead through the region of the mask container, whereby a grasping area can be doubled. With a standard supply channel with a width of 40 cm, in which a mask container with a width of 40 cm is arranged, a grasping region of approximately 80 cm now can be achieved. Therefore, grasping the oxygen masks for passengers in seats, which are offset laterally to the supply channel, optimally is made possible. This may make it possible that the reachability of the masks also with new seating layout variations, such as in a Staggered Concept, Center 5 Abreast etc., can be improved substantially.

Next, preferred exemplary embodiment of the present invention will be described with reference to the accompanying figures. In the figures:

DETAILED DESCRIPTION

Figure 1:
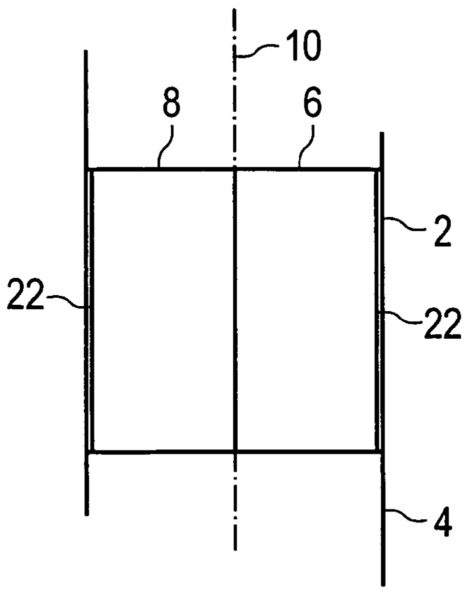
FIG. 1 shows a plan view of an embodiment of a cover assembly of a mask container with closed covers in the ceiling region of the passenger cabin of an aircraft according to the present invention.

In the following description of the figures, the same reference numerals are used for the same or corresponding elements.

FIG. 1 shows a plan view of one embodiment of a cover assembly of a mask container, which is arranged in a supply channel in the ceiling region 20 of a passenger cabin of an aircraft. The reference numeral 2 designates the mask container, which is arranged in a supply channel 4. Such supply channels typically have a width of approximately 40 cm. The reference numeral 10 designates the longitudinal axis of the aircraft. As can be seen from FIG. 1, the supply channel 4 extends essentially along the longitudinal axis 10 of the aircraft. An opening of the mask container 2 is covered with a first cover 6 and a second cover 8 with a non-activated oxygen system. The covers 6 and 8, in the closed state, preferably are flush with adjacent ceiling structures of the passenger cabin of the aircraft. The covers 6 and 8 are attached by means of a hinge assembly 22 on the side regions of the mask container 2 or on adjacent ceiling structures. The hinges 22 have pivot axes, which are substantially parallel to the longitudinal axis 10 of the aircraft. Preferably, the covers 6 and 8 are structured, such that each cover essentially covers half of the opening of the mask container 2. However, depending on which grasping region is desired for the oxygen masks arranged in the mask holders 2, also an asymmetrical design of the covers 6 and 8 can be advantageous.

Figure 2:
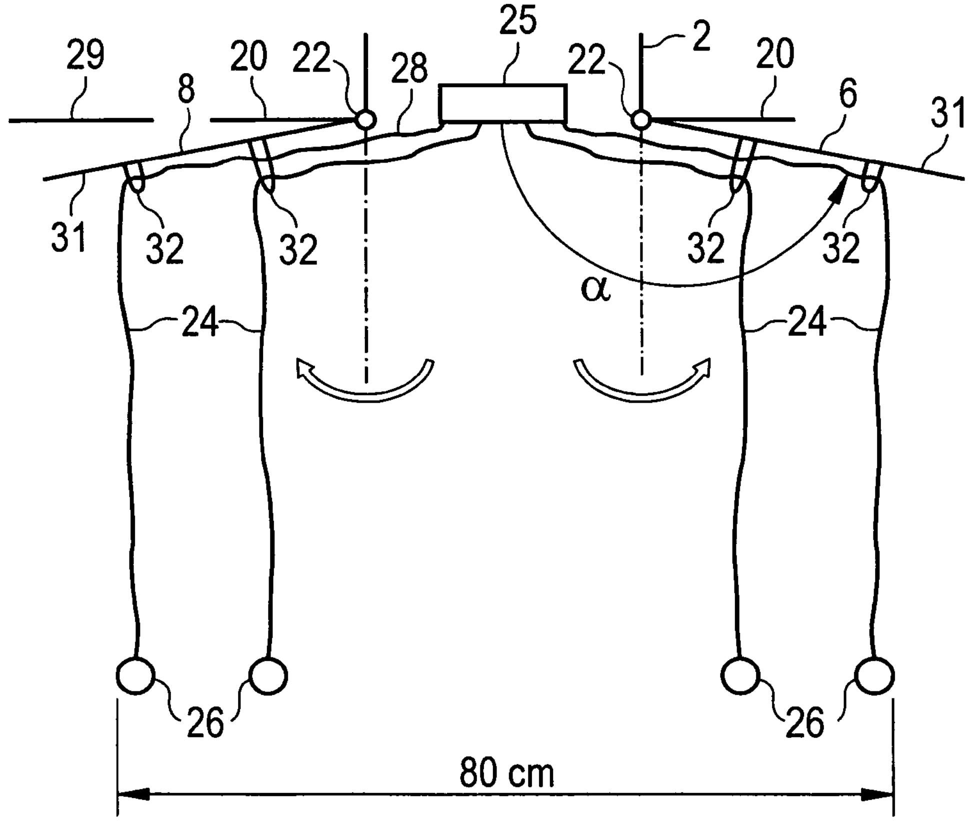
FIG. 2 shows a side view of the embodiment of FIG. 1 with opened covers according to the present invention.

FIG. 2 shows a side view of the embodiment of FIG. 2, whereby the covers 6 and 8 are opened and the oxygen masks 26, which are connected by means of tubes 24 with an oxygen source 25, hang down from the ceiling region 20 of the passenger cabin of the aircraft, such that they can be grabbed the most easily by the passengers in the seats lying thereunder. The state shown in FIG. 2 also can be designated as the activated state or opened state.

As can be seen from FIG. 2, the covers 6 and 8 essentially are opened so far that an opening angle α between a horizontal 29 and the covers is greater than 90°. Preferably, the opening angle moves in a range of 100° to 180°. In the embodiment shown in FIG. 2, the opening angle is approximately 170°.

As shown in FIG. 2, on the inner surfaces 31 of the covers, which face into the mask container 2 in the closed state, straps 32 are provided, through which the tubes 24 of the oxygen masks are guided. In this manner, upon opening of the covers 6 and 8, the tubes 24 of the oxygen masks 26 are taken along with the covers 6 and 8, so that the oxygen masks 26, which hang down essentially perpendicular based on gravitational force, hang down from points, which lie outside of the supply channel 4 in the plan view.

Figure 4:
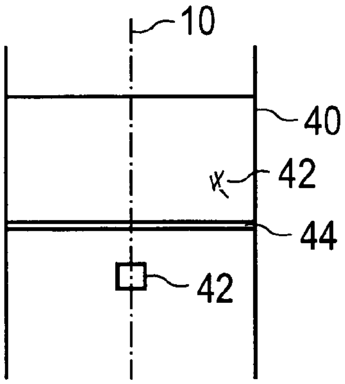
FIG. 4 shows a plan view of a known mask container with a cover.
Figure 5:
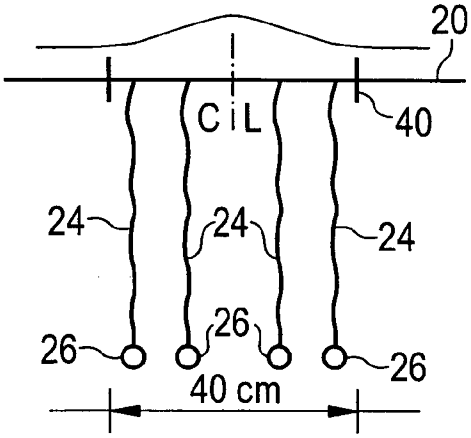
FIG. 5 shows a side view of the assembly of FIG. 4 with an activated oxygen system.

Compared to the known mask container, which has been described with reference to FIGS. 4 and 5, a grasping region, that is, a distance between the outermost oxygen masks with opened covers 6 and 8, can be doubled. According to the present invention, for example, with a supply channel width of 40 cm and, therewith, a width of 40 cm of the opening 28, a grasping region of approximately 80 cm is achieved.

Figure 3:
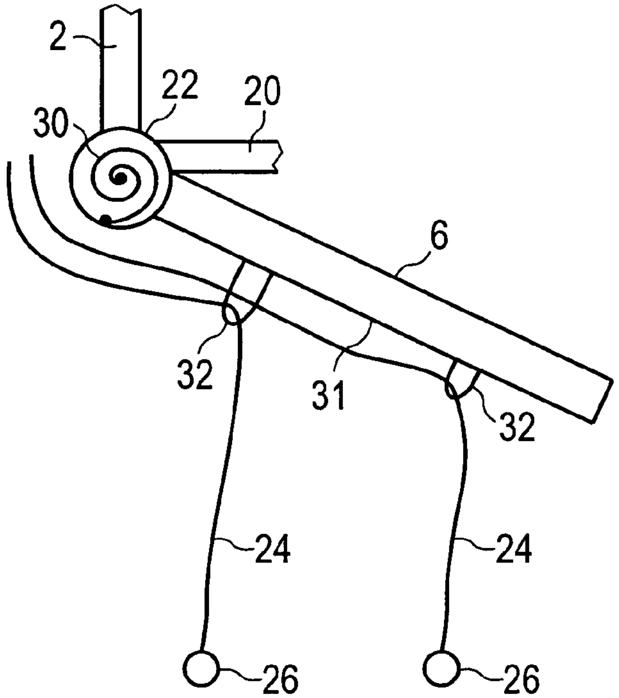
FIG. 3 shows a sectional view of a detail of the embodiment of FIG. 1 according to the present invention.

FIG. 3 shows a lateral sectional view of a detail of the embodiment shown in FIGS. 1 and 2. As shown in FIG. 3, in the hinge 22, a means 30 is provided, which holds the cover 6 in the opened state (spring-biased). This can be a spring, for example. Preferably, the spring is prestressed in the closed state. Then, an unlocking of the cover suffices and the cover is moved automatically into the opened state and held there. A similar means 30 also is provided for the cover 6.

Advantageously, by the arrangement of the pivot axes of the covers 6 and 8, upon triggering of the oxygen system, for example, based on a drop in pressure in the passenger cabin of the aircraft, covering of signs, such as, for example, Fasten Seat Belt or similar signs, is prevented. This arrangement also makes possible that no loudspeakers in the typical location areas are covered. In this manner, it is not necessary to provide redundant signs and additional loudspeakers, whereby a weight savings is achieved.

The invention claimed is:

1. A cover assembly for a mask container for arrangement in a supply channel in a ceiling region of an aircraft having a longitudinal axis, wherein the mask container has an opening, and wherein the cover assembly comprises:

a first cover and a second cover;

wherein the first cover has a first pivot axis which is essentially parallel to the longitudinal axis of the aircraft wherein the longitudinal axis extends from a front area of the aircraft to a rear area of the aircraft;

multiple guiding devices, wherein each guiding device guides a single tube connecting the oxygen mask with an oxygen system of the aircraft, wherein the guiding device is mounted on an inner surface of the first cover at an edge region of the first cover opposite the first pivot axis;

wherein the first cover and the second cover, respectively, are arrangeable in a closed state, in which the first and second covers close the opening of the mask container;

wherein the first cover and the second cover, respectively, are arrangeable in an opened state, in which the first and second covers uncover the opening of the mask container;

wherein in the opened state, a first and second opening angle between the first and second covers and a horizontal, respectively, is greater than 90°;

wherein the first cover is arranged to move the guiding device from the area of the mask container in a lateral direction with respect to the longitudinal axis of the aircraft when the first cover opens, so that for a passenger sitting next to the mask container an access to the oxygen masks is simplified.

2. A cover assembly as claimed in claim 1, wherein the second cover has a second pivot axis; and wherein the first and the second pivot axes are substantially parallel to the longitudinal axis.

3. A cover assembly as claimed in claim 1, wherein a first retaining means is provided in order to hold the first cover in the opened state; and wherein a second retaining means is provided in order to hold the second cover in the opened state.

4. A cover assembly as claimed in claim 1, wherein the first and the second opening angles between the first and second covers in the opened state and a horizontal, respectively, lies in a range of approximately 100° to approximately 180°.

5. A cover assembly as claimed in claim 1, wherein the mask container is arranged for storage of oxygen masks in a supply channel in the ceiling region of a passenger area of the aircraft;

wherein the first and the second covers, respectively, have an inner surface, which, when the first and second covers are in the closed state, face into the opening; and wherein on the inner surface on at least one of the first and second covers, at least one strap is mounted, through which at least one of the tubes is guidable.

6. A cover assembly as claimed in claim 1, further comprising a locking mechanism and an opening mechanism, wherein the opening mechanism is adapted to move the first cover automatically to the open state when the locking mechanism is unlocked.

7. A mask container for an oxygen system of an aircraft having a longitudinal axis, the mask container adapted for being arranged in a ceiling region of the aircraft, comprising:

a first cover and a second cover;

wherein the first cover has a pivoting axis which is essentially parallel to the longitudinal axis of the aircraft wherein the longitudinal axis extends from a front area of the aircraft to a rear area of the aircraft;

multiple guiding devices, wherein each guiding device guides a single tube connecting the oxygen mask with an oxygen system of the aircraft, wherein the guiding device is mounted on an inner surface of the first cover at an edge region of the first cover opposite the pivoting axis;

wherein the first cover and the second cover, respectively, are arrangeable in a closed state, in which the first and second covers close the opening of the mask container;

wherein the first cover and the second cover, respectively, are arrangeable in an opened state, in which the first and second covers uncover the opening of the mask container;

wherein in the opened state, a first and second opening angle between the first and second covers and a horizontal, respectively, is greater than 90;

wherein the first cover is arranged to move the guiding device from the area of the mask container in a lateral direction with respect to a longitudinal axis of the aircraft when the first cover opens, so that for a passenger sitting next to the mask container an access to the oxygen masks is simplified.

8. A mask container as claimed in claim 7, further comprising a locking mechanism and an opening mechanism, wherein the opening mechanism is adapted to move the first cover automatically to the open state when the locking mechanism is unlocked.

9. An aircraft having a longitudinal axis, the aircraft comprising:

a cover assembly for a mask container for arrangement in a supply channel in a ceiling region of the aircraft, the mask container having an opening;

wherein the cover assembly comprises a first cover and a second cover the first cover having a pivoting axis which is essentially parallel to the longitudinal axis of the aircraft wherein the longitudinal axis extends from a front area of the aircraft to a rear area of the aircraft;

multiple guiding devices, wherein each guiding device guides a single tube connecting the oxygen mask with an oxygen system of the aircraft, wherein the guiding device is mounted on an inner surface of the first cover at an edge region of the first cover opposite the pivoting axis;

wherein the first cover and the second cover, respectively, are arrangeable in a closed state, in which the first and second covers close the opening of the mask container;

wherein the first cover and the second cover, respectively, are arrangeable in an opened state, in which the first and second covers uncover the opening of the mask container;

wherein in the opened state, a first and second opening angle between the first and second covers and a horizontal, respectively, is greater than 90;

wherein the first cover is arranged to move the guiding device from the area of the mask container in a lateral direction with respect to a longitudinal axis of the aircraft when the first cover opens, so that for a passenger sitting next to the mask container an access to the oxygen masks is simplified.

10. An aircraft as claimed in claim 9, further comprising a locking mechanism and an opening mechanism, wherein the opening mechanism is adapted to move the first cover automatically to the open state when the locking mechanism is unlocked.

* * * * *

UNITED STATES PATENT AND TRADEMARK OFFICE

CERTIFICATE OF CORRECTION

PATENT NO. : 7,621,275 B2
APPLICATION NO. : 11/064667
DATED : November 24, 2009
INVENTOR(S) : Hans Joachim Fischer It is certified that error appears in the above-identified patent and that said Letters Patent is hereby corrected as shown below:

Face Page, under Abstract after "aircraft and" insert --,--

Col. 2, Line 60, --were-- should read --is--

Col. 3, Line 9, delete "In the figures:"

Col. 4, line 8, delete "," after "from points"

Col. 6, Line 3, "90" should read --90°--

Col. 6, Line 21, insert --,-- after "second cover"

Col. 6, Line 40, "90" should read --90°--

Signed and Sealed this
Twenty-eighth Day of December, 2010

David J. Kappos

David J. Kappos
*Director of the United States Patent and Trademark Office*